US012078304B2

(12) United States Patent
He

(10) Patent No.: US 12,078,304 B2
(45) Date of Patent: Sep. 3, 2024

(54) LAMP-STRING GRID SCREEN AND LUMINOUS COMPONENT

(71) Applicant: SHANGYOU JIAYI LIGHTING PRODUCT CO., LTD., Jiangxi (CN)

(72) Inventor: Yaowen He, Jiangxi (CN)

(73) Assignee: SHANGYOU JIAYI LIGHTING PRODUCT CO., LTD., Jiangxi (CN)

( * ) Notice: Subject to any disclaimer, the term of this patent is extended or adjusted under 35 U.S.C. 154(b) by 0 days.

(21) Appl. No.: 18/469,932

(22) Filed: Sep. 19, 2023

(65) Prior Publication Data

US 2024/0027037 A1 Jan. 25, 2024

(30) Foreign Application Priority Data

Jul. 20, 2022 (CN) ........................ 202221910789.0

(51) Int. Cl.

| | |
|---|---|
| ***F21S 4/15*** | (2016.01) |
| ***F21V 17/08*** | (2006.01) |
| ***F21V 23/00*** | (2015.01) |
| *F21Y 107/70* | (2016.01) |

(52) U.S. Cl.

CPC ................ *F21S 4/15* (2016.01); *F21V 17/08* (2013.01); *F21V 23/001* (2013.01); *F21Y 2107/70* (2016.08)

(58) Field of Classification Search

CPC ....... F21S 4/10; F21S 4/26; F21S 4/15; F21V 17/08; F21V 23/001; F21Y 2107/70

See application file for complete search history.

(56) References Cited

U.S. PATENT DOCUMENTS 10,184,654 B1 * 1/2019 Chen .................. F21V 33/0028
11,353,175 B1 * 6/2022 Xie ....................... F21V 17/101

FOREIGN PATENT DOCUMENTS

CA 2706240 A1 * 5/2009 ............. F21S 2/005

OTHER PUBLICATIONS

Innovation Q+ NPL Search (Year: 2024).*

* cited by examiner

*Primary Examiner* — Anabel Ton

(74) *Attorney, Agent, or Firm* — Meunier Carlin & Curfman LLC

(57) ABSTRACT

Provided are a lamp-string grid screen and a luminous component, comprising a transparent wire and a lamp string wire; multiple transparent wires and multiple lamp string wires are arranged crosswise in a grid pattern; multiple lamp beads are arranged on the lamp string wire; the lamp beads on the lamp string wire are glued to the transparent wire, and multiple lamp beads are arranged in an array; or, the transparent wire and the lamp string wire are connected by a fastener, and multiple lamp beads are arranged in a diamond pattern.

9 Claims, 4 Drawing Sheets

LAMP-STRING GRID SCREEN AND LUMINOUS COMPONENT

CROSS-REFERENCES TO RELATED APPLICATIONS

The present disclosure claims the priority to the Chinese patent application with the filing No. 2022219107890, entitled “Lamp-String Grid Screen and Luminous Component” filed with the Chinese Patent Office on Jul. 20, 2022, the entire content of which is incorporated herein by reference.

TECHNICAL FIELD

The present disclosure relates to the technical field of luminous lamp strings, and particularly to a lamp-string grid screen and a luminous component.

BACKGROUND ART

Existing grid screens use plastic or PVC strips to secure lamp beads of the lamp strings and create grid-shaped screens. However, the use of plastic or PVC strips for securing the lamp beads of the lamp strings results in high costs, leading to an overall high cost for the grid screen.

SUMMARY

The objective of the present disclosure is to provide a lamp-string grid screen and a luminous component, which solves the technical problem in the prior art that the use of plastic or PVC strips for securing the lamp beads of the lamp strings to form the grid screen results in high costs.

In the first aspect, the lamp-string grid screen provided by the present disclosure comprises transparent wires and lamp string wires;

multiple transparent wires and multiple lamp string wires intersect in a grid pattern;

multiple lamp beads are arranged on the lamp string wire; and the lamp beads on the lamp string wire are glued to the transparent wire, and multiple lamp beads are arranged in an array;

or, the transparent wire and the lamp string wire are connected by a fastener, and multiple lamp beads are arranged in a diamond pattern.

In optional embodiments, the lamp bead is provided with a groove, and the transparent wire passes through the groove.

In optional embodiments, the transparent wire located inside the groove is fixed to the lamp beads by the adhesive.

In optional embodiments, the fastener is configured in a cylindrical shape.

In optional embodiments, both the transparent wire and the lamp string wire pass through the fastener.

In optional embodiments, the fastener is made of a copper sheet.

In optional embodiments, the lamp string wire is provided with a power line configured for delivering electrical power to the lamp beads.

In optional embodiments, the lamp string wire is provided with a signal line configured for transmitting signals to the lamp string.

In optional embodiments, the transparent wire is made of translucent insulating material.

In the second aspect, the luminous component provided by the present disclosure comprises the lamp-string grid screen.

The lamp-string grid screen provided by the present disclosure comprises a transparent wire and a lamp string wire; multiple transparent wires and multiple lamp string wires are arranged crosswise to form a grid pattern; multiple lamp beads are arranged on the lamp string wire; the lamp beads on the lamp string wire are glued to the transparent wire, and multiple lamp beads are arranged in an array; or, the transparent wire and the lamp string wire are connected by a fastener, and multiple lamp beads are arranged in a diamond pattern. By using transparent wire instead of PVC strips and connecting the lamp beads to the transparent wire using adhesive to create a grid-shaped screen in an array arrangement, or by using a fastener to secure the transparent wire and lamp string wire together to form a grid-shaped screen in a diamond arrangement, the transparent wire offers a lower cost compared to plastic or PVB strips. This solves the technical problem in the prior art that the use of plastic or PVC strips for securing the lamp beads of the lamp strings to form the grid screen results in high costs.

BRIEF DESCRIPTION OF DRAWINGS

In order to more clearly illustrate the specific embodiments of the present disclosure or the technical solution in the prior art, the drawings required to be used in the description of the specific embodiment or prior art will be briefly introduced as follows. Obviously, the drawings described below are some embodiments of the present disclosure, and those of ordinary skill in the art, without paying inventive effort, can also obtain other drawings according to these drawings.

Figure 1:
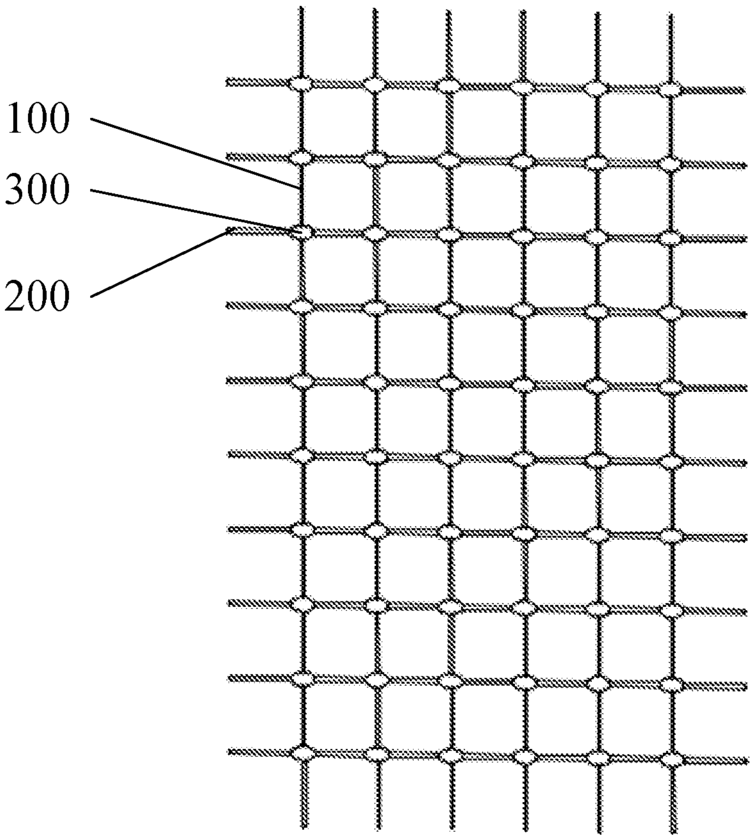
FIG. 1 is a schematic diagram of the structure of a lamp-string grid screen in one embodiment provided by the present disclosure.
Figure 2:
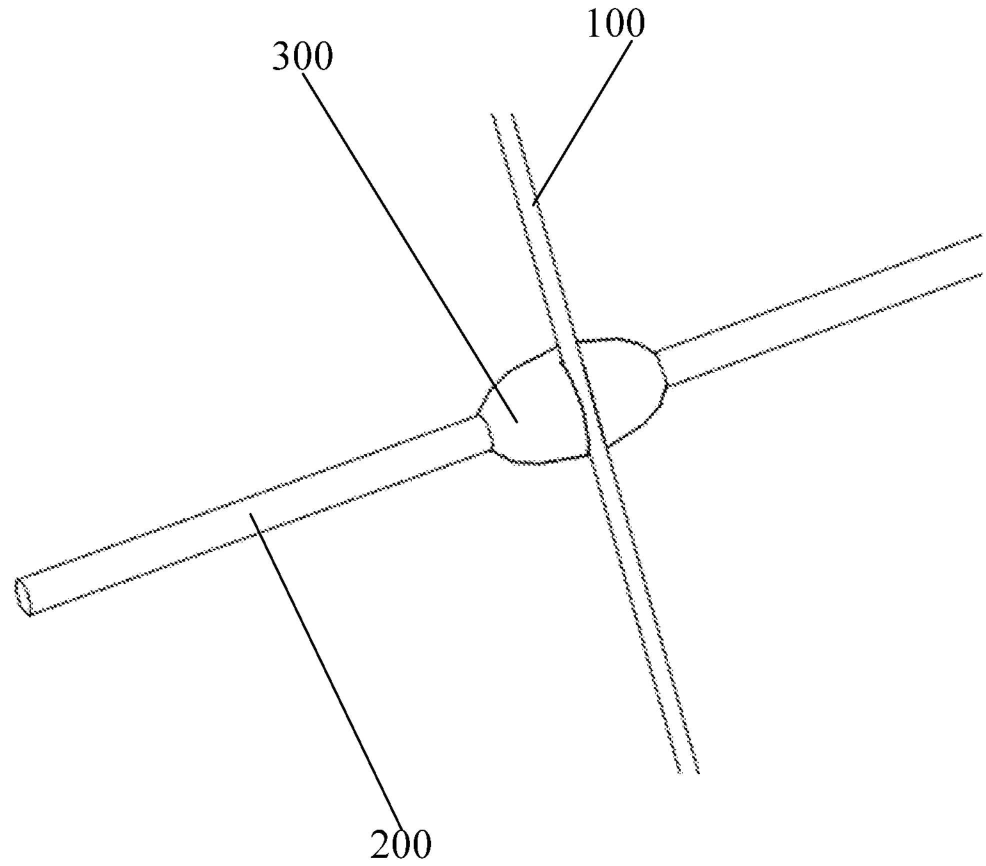
FIG. 2 is a schematic diagram of the installation structure between lamp beads and transparent wire in one embodiment of the lamp-string grid screen provided by the present disclosure.
Figure 3:
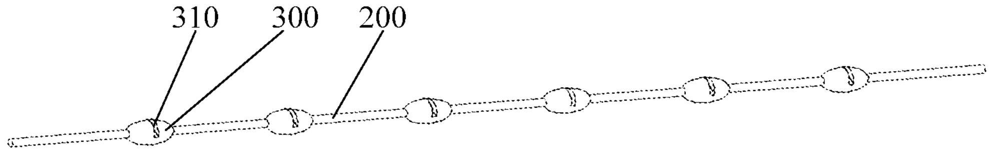
FIG. 3 is a schematic diagram of the structure of lamp beads in one embodiment of the lamp-string grid screen provided by the present disclosure.
Figure 4:
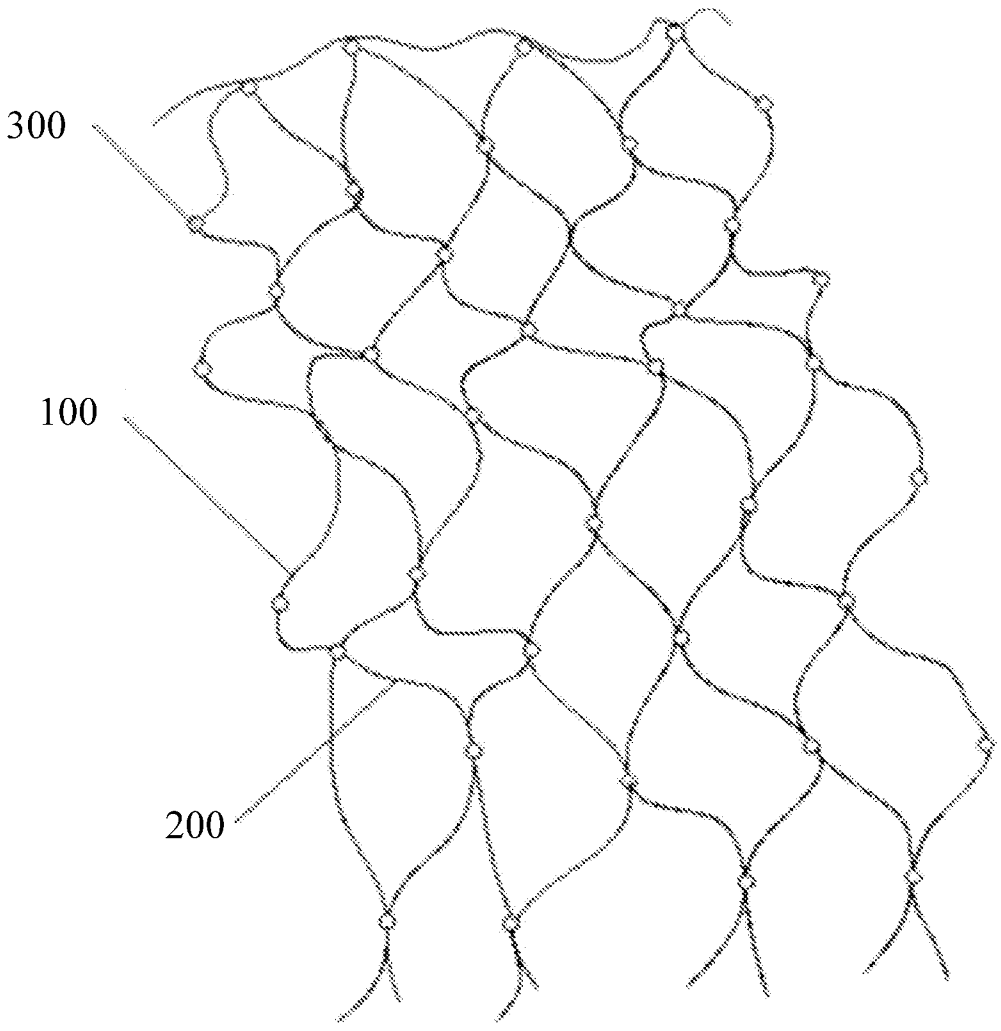
FIG. 4 is a schematic diagram of the structure of the lamp-string grid screen in another embodiment provided by the present disclosure.
Figure 5:
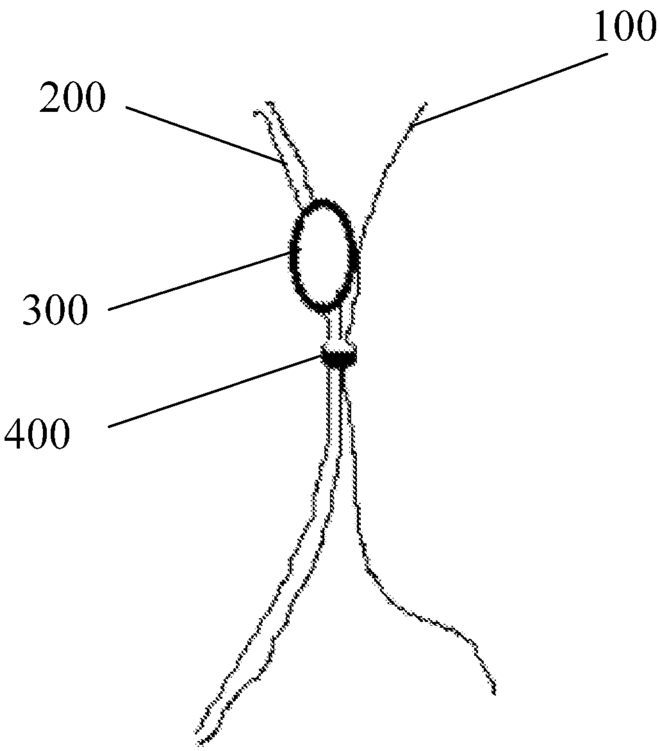
FIG. 5 is a schematic diagram of the installation structure of a fastener in another embodiment of the lamp-string grid screen provided by the present disclosure.

Reference numerals: 100—transparent wire; 200—lamp string wire; 300—lamp bead; 310—groove; 400—fastener.

DETAILED DESCRIPTION OF EMBODIMENTS

To clarify the objectives, technical solutions, and advantages of the embodiments of the present disclosure, the following description of the technical solutions in the embodiments of the present disclosure will be provided in a clear and comprehensive manner, in conjunction with the drawings in the embodiments of the present disclosure. Clearly, the described embodiments are part of the embodiments of the present disclosure and not the entirety of the embodiments. The components of embodiments of the present disclosure which are generally described and illustrated in the drawings herein can be arranged and designed in a variety of different configurations.

Therefore, the following detailed description of the embodiments of the present disclosure provided in the drawings is not intended to limit the scope of protection of the present disclosure but merely represents selected embodiments of the present disclosure. Based on the embodiments in the present disclosure, all other embodiments obtained by those of ordinary skill in the art without making inventive efforts are within the scope of protection of the present disclosure.

It should be noted that similar numerals and letters denote similar terms in the following drawings, and once an item is defined in one drawing, it does not need to be further defined and discussed in subsequent drawings.

In the description of the present disclosure, it should be indicated that orientation or positional relationships indicated by terms such as "center", "upper", "lower", "left", "right", "vertical", "horizontal", "inner", and "outer" are based on orientation or positional relationships as shown in the drawings, or orientation or positional relationships of a product when being conventionally placed in use, merely for facilitating describing the present disclosure and simplifying the description, rather than indicating or suggesting that related devices or elements have to be in the specific orientation or configured and operated in a specific orientation, and therefore, they should not be construed as limitation to the present disclosure. Besides, terms such as "first", "second", and "third" are merely for distinctive description, but should not be construed as indicating or implying importance in the relativity.

Moreover, terms "horizontal", "vertical", and "overhanging" and the like do not mean that the parts are required to be absolutely horizontal or overhanging, but may be slightly inclined. For example, by "horizontal" it merely means that a structure is more horizontal in comparison with "vertical", rather than being completely horizontal, while the structure can be slightly inclined.

In the description of the present disclosure, it should be further illustrated that, unless otherwise specifically regulated and defined, the terms "provide", "mount", "link", and "connect" should be understood in a broad sense, for example, connection may be fixed connection, detachable connection, or integrated connection; it may be mechanical connection or electrical connection; it may be direct joining or indirect joining through an intermediary, and it also may be inner communication between two elements. For a person ordinarily skilled in the art, specific meanings of the above-mentioned terms in the present disclosure could be understood according to specific circumstances.

Some embodiments of the present disclosure are described in detail below, in conjunction with the drawings. In situations where they do not conflict, the following embodiments and their features can be combined with each other.

As shown in FIG. 1, FIG. 2, FIG. 3, FIG. 4, and FIG. 5, the lamp-string grid screen provided in this embodiment comprises a transparent wire 100 and a lamp string wire 200; multiple transparent wires 100 and multiple lamp string wires 200 are arranged crosswise in a grid pattern; multiple lamp beads 300 are arranged on the lamp string wire 200; and the lamp beads 300 on the lamp string wire 200 are glued to the transparent wire 100, and the multiple lamp beads 300 are arranged in an array; or, the transparent wire 100 and the lamp string wire 200 are connected by a fastener 400, and the multiple lamp beads 300 are arranged in a diamond pattern.

Specifically, the lamp-string grid screen provided in this embodiment is provided with two implementation modes. In the first mode, the transparent wire 100 and the lamp string wire 200 are arranged in a cross manner to form an array grid. The lamp beads 300 on the lamp string wire 200 and the transparent wire 100 are connected using adhesive, thereby securing the transparent wire 100 and creating the lamp-string grid screen.

As another implementation mode, the transparent wire 100 is connected to the lamp string wire 200 through fastener 400, thereby forming the lamp-string grid screen in diamond-shaped arrangement. It is important to note that to avoid the fastener 400 from affecting the illumination of the lamp beads 300, the positions of the fasteners 400 are staggered with respect to the positions of the lamp beads 300, thereby preventing the fasteners 400 from covering the lamp beads 300.

The lamp-string grid screen provided by the present disclosure comprises a transparent wire 100 and a lamp string wire 200; multiple transparent wires 100 and multiple lamp string wires 200 are arranged crosswise in a grid pattern; multiple lamp beads 300 are arranged on the lamp string wire 200; the lamp beads 300 on the lamp string wire 200 are glued to the transparent wire 100, and the multiple lamp beads 300 are arranged in an array; or, the transparent wire 100 and the lamp string wire 200 are connected by a fastener 400, and the multiple lamp beads 300 are arranged in a diamond pattern. By using transparent wire 100 instead of PVC strips and connecting the lamp beads 300 to the transparent wire 100 using adhesive to create a grid-shaped screen in an array arrangement, or by using the fasteners 400 to secure the transparent wire 100 and lamp string wire 200 together to form the grid-shaped screen in a diamond arrangement, the transparent wire 100 offers a lower cost compared to plastic or PVB strips. This solves the technical problem in the prior art that the use of plastic or PVC strips for securing the lamp beads 300 of the lamp strings to form the grid screen results in high costs.

According to the above-mentioned embodiments, in optional implementation modes, the lamp beads 300 in the lamp-string grid screen provided in this embodiment are provided with grooves 310, and the transparent wire 100 passes through the grooves 310.

Specifically, to facilitate the rapid installation of the transparent wire 100 onto the lamp beads 300, the grooves 310 are formed on the back of the lamp beads 300. The transparent wire 100 is positioned inside the grooves 310, and the transparent wire 100 passes through the grooves 310. The arrangement of the grooves 310 ensures that the transparent wire 100 is located within the grooves 310, thereby preventing the installation of the transparent wire 100 from causing the entire lamp bead 300 to protrude.

It is worth noting that grooves 310 on the lamp beads 300 are not mandatory. It is also possible to directly use adhesive to secure the transparent wire 100 onto the lamp beads 300.

In optional embodiments, the transparent wire 100 located within the grooves 310 is secured to the lamp beads 300 by adhesive.

Specifically, after placing the transparent wire 100 into the grooves 310, the adhesive is used to secure the transparent wire 100 in the grooves 310 of the lamp beads 300, thereby preventing the transparent wire 100 from detaching from the grooves 310 of the lamp beads 300.

In optional embodiments, the fastener 400 is configured in a cylindrical shape, and both the transparent wire 100 and the lamp string wire 200 pass through the fastener 400.

Specifically, the fastener 400 is designed in a cylindrical shape, wherein the cylindrical fastener 400 surrounds to create an accommodating space. The transparent wire 100 and the lamp string wire 200 pass through the accommodating space, and the fastener 400 is used to secure both the transparent wire 100 and the lamp string wire 200.

Figure 6:
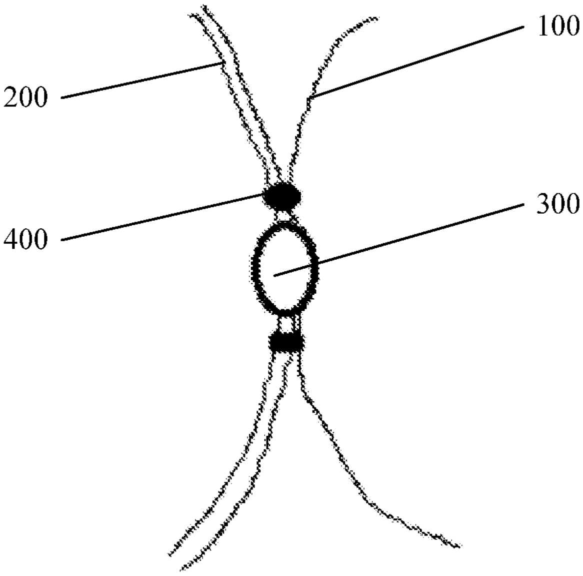
FIG. 6 is another schematic diagram of the installation structure of the fastener in another embodiment of the lamp-string grid screen provided by the present disclosure.

Additionally, as shown in FIG. 6, two fasteners 400 can be arranged on both sides of the lamp beads 300 to ensure a more secure and orderly fixation of the lamp beads 300.

In optional embodiments, the fastener 400 is made of a copper sheet.

Specifically, the fastener 400 is made of copper sheet and the copper sheets are connected end to end to form a cylindrical shape. Alternatively, the material of the fastener 400 can also be plastic.

In optional embodiments, the lamp string wire 200 is provided with a power line configured for delivering electrical power to the lamp beads 300.

Specifically, the lamp string wire 200 is provided therein with a power line, with one end of the power line electrically connected to the lamp beads 300 on the lamp string wire 200, and the other end of the power line connected to an external power source. The power line is used to deliver electrical power to the lamp beads 300.

In optional embodiments, the lamp string wire 200 is provided with a signal line configured for transmitting signals to the lamp string.

Specifically, the lamp string wire 200 is provided therein with a signal line, with one end of the signal line electrically connected to the lamp beads 300 on the lamp string wire 200, and the other end of the signal line connected to an external signal controller device. The signal line is used to transmit signals to the lamp beads 300.

In optional embodiments, the transparent wire 100 is made of translucent insulating material.

Specifically, the material of the transparent wire 100 is specifically configured to be translucent insulating material, and the transparent wire 100 does not contain a power line therein, which is only for fixation function.

Furthermore, as an alternative method, the lamp beads 300 in the lamp-string grid screen provided in this embodiment are fixed to the lamp string using fastening ropes. The back of the lamp beads 300 exposes the grooves 310, and the transparent wire 100 is placed within the grooves 310, thereby creating a luminous-rope-type lamp-string grid screen.

Additionally, as an alternative method, the lamp beads 300 in the lamp-string grid screen provided in this embodiment are mounted on plug-in ends. The lamp beads 300 are electrically connected to the plug-in electrodes on the plug-in ends via wires. The plug-in ends are inserted into the fixed ends on the lamp string, so as to allow the plug-in electrodes on the plug-in ends to connect with the power line on the fixed ends. After securing the transparent wire 100 and the lamp string wire 200 using fasteners 400, a lamp-string grid screen with the lamp beads 300 in a plug-in manner is formed.

Moreover, to secure the plug-in ends onto the fixed ends, the outer wall of the plug-in ends is provided with plug-in protrusions, while the fixed ends are provided with plug-in slots. The plug-in protrusions extend into the plug-in slots, thereby securing the plug-in ends.

The luminous component provided in this embodiment comprises the lamp-string grid screen.

Since the technical effects of the luminous component provided in this embodiment are the same as the technical effects of the lamp-string grid screen provided in the above-mentioned embodiments, they will not be reiterated here.

Finally, it should be noted that the above embodiments are only used to illustrate the technical solution of the present disclosure, not to limit it; while the present disclosure has been described in detail with reference to the preceding embodiments, it will be understood by those of ordinary skill in the art that, one may still modify the technical solution described in the preceding embodiments, or replace some or all of the technical features equally; and these modifications or substitutions do not depart the essence of the corresponding technical solution from the scope of the technical solution of the embodiments of the present disclosure.

What is claimed is:

1. A lamp-string grid screen, comprising transparent wires and lamp string wires, wherein multiple transparent wires and multiple lamp string wires are arranged crosswise in a grid pattern;

multiple lamp beads are arranged on each of the lamp string wires, wherein each of the lamp beads is provided with a groove, and a corresponding transparent wire passes through the groove; and the lamp beads on each of the lamp string wires are glued to a corresponding transparent wire, and the multiple lamp beads are arranged in an array;

or, each of the transparent wires and a corresponding lamp string wire are connected by a fastener, and the multiple lamp beads are arranged in a diamond pattern.

2. The lamp-string grid screen according to claim 1, wherein the corresponding transparent wire located inside the groove is fixed to the lamp beads by an adhesive.

3. The lamp-string grid screen according to claim 1, wherein the fastener is configured in a cylindrical shape.

4. The lamp-string grid screen according to claim 3, wherein both a corresponding transparent wire and a corresponding lamp string wire pass through the fastener.

5. The lamp-string grid screen according to claim 4, wherein the fastener is made of a copper sheet.

6. The lamp-string grid screen according to claim 1, wherein each of the lamp string wires is provided with a power line configured to deliver an electrical power to the lamp beads.

7. The lamp-string grid screen according to claim 6, wherein each of the lamp string wires is provided with a signal line configured to transmit signals to a lamp string.

8. The lamp-string grid screen according to claim 1, wherein each of the transparent wires is made of a translucent insulating material.

9. A luminous component, comprising the lamp-string grid screen according to claim 1.

* * * * *